Feb. 23, 1932. E. GMINDER 1,846,859
PRODUCTION OF BAST FIBERS FROM VEGETABLE STALKS
Filed March 2, 1931
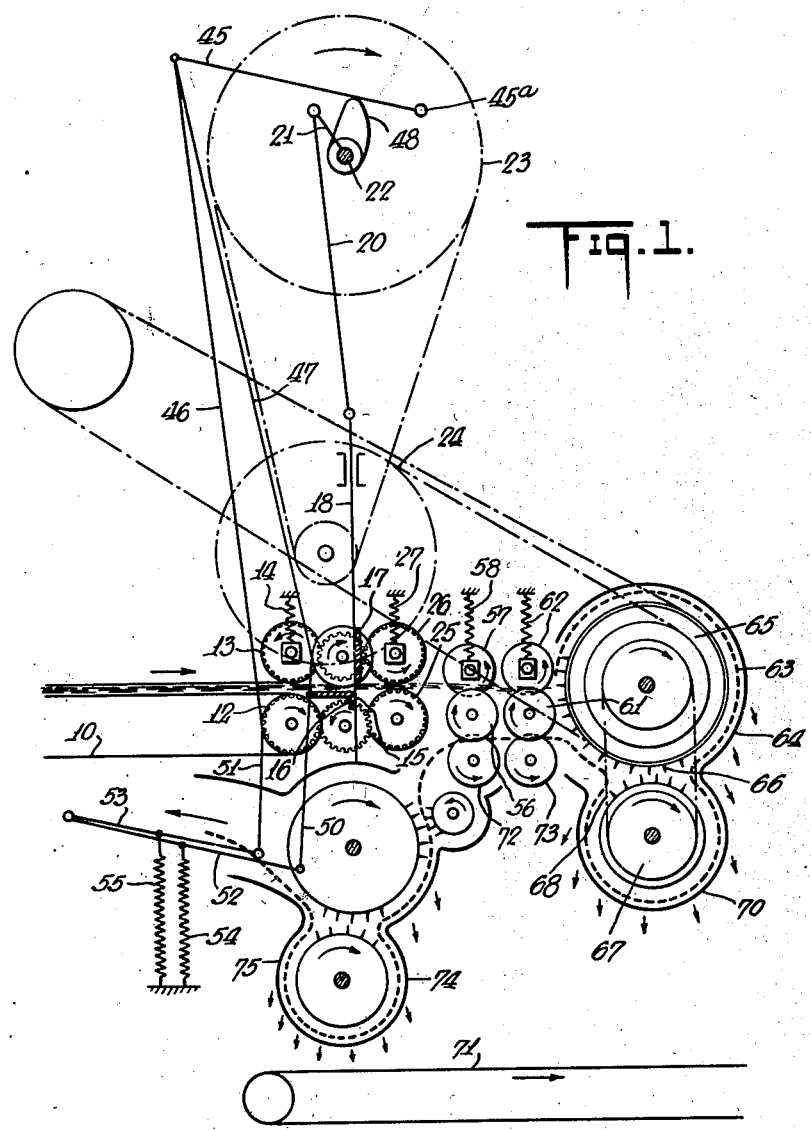

Patented Feb. 23, 1932

1,846,859

UNITED STATES PATENT OFFICE

EMIL GMINDER, OF REUTLINGEN, GERMANY

PRODUCTION OF BAST FIBERS FROM VEGETABLE STALKS

Application filed March 2, 1931, Serial No. 519,645, and in Germany January 4, 1930.

In the treatment of vegetable stalks and blades to obtain therefrom fibers capable of being spun, it is customary to cut the stalks or blades into sections of a given maximum length preliminary to the cleaning of the material by scutching and beating. In the general practice the material is fed continuously to, through and from the cutting mechanism. Considerable difficulty has heretofore been encountered due to the fact that a sufficiently precise and smooth cut cannot be obtained during the continuous feeding of the material, and it is not possible to obtain a sufficiently uniform maximum length.
The main object of the present invention is to overcome this objection and to secure the desired uniformity of cut and maximum length of fibers. I have discovered that I can secure this object by carrying out the breaking and beating operations continuously, but feeding the material to the cutting mechanism step by step and permitting the material to remain at rest during the cutting operation.
In a preferred embodiment of my invention I employ a reciprocating type of shear cutter and so control the feed mechanism that the material is advanced only when the knife is in rest position.
In the accompanying drawings I have shown merely one embodiment of my invention, but it will be obvious that various changes may be made in the details of construction and the arrangement of the parts without departing from the scope of my invention.

In these drawings:

Fig. 1 is a side elevation somewhat diagrammatically of an arrangement embodying the present invention, and Figs. 2 and 3 are top plan views showing details of a portion of the means for feeding stalks into the field of action of the cutting means.
Like reference characters denote like parts in the several figures of the drawings.

In the specific construction shown, there is provided a stalk conveyor belt 10 which is driven by a driving pulley or roller 12, cooperating with a delivery or feed roller 13 which is urged downwardly upon said belt through the action of springs 14. These rollers 12 and 13 serve to feed the stalks toward a cutting table 15 after they leave the conveyor belt 10. This cutting table 15 is provided with a stationary shear 16 which cooperates with a knife or shear 17 mounted for reciprocation with a rod 18 slidable along suitable guides and connected to a pitman or connecting member 20 which is connected to a crank rod 21 mounted on a shaft 22. This shaft 22 has fixed thereto a pulley 23 which is driven from a suitable source of power 24, such as a motor. As the shaft 22 rotates, the connecting rod 18 is reciprocated between its guides so that the shear 17 intermittently cooperates with the shear 16 to cut the stalk. After the stalks have been cut and moved to the right by the feeding of succeeding abutting stalks, the travel of these stalks is continued by the action of a pair of cooperating discharge rollers 25 and 26, the roller 26 being urged into cooperative relationship with the roller 25 under the action of springs 27.

In order to synchronize the delivery of stalks to the cutting means and permit this feeding to be interrupted sufficiently to effect clean cutting, the top rollers 13 and 26 are mounted on shafts which carry gears 30 and 31 respectively. These gears mesh with a drive gear 32 connected to a pair of interconnected adjoining drums 33 and 34 through a pawl and ratchet arrangement 35 or any other suitable overrunning clutch, so as to transmit motion through the shaft in one direction only.

The two rollers 12 and 25 also have mounted thereon a pair of gears 36 and 37 which mesh with an intermediate idler gear 38. Coupled to the shaft of the roller 12 by means of a pawl and ratchet or over-run clutch 40 are a pair of interconnected adjoining drums 41 and 42. The drive of the feed and discharge rollers is connected for operation in synchronism with the operation of the cutting knife by means of a lever 45, one end of which is pivoted at a stationary point 45a, and the other end of which has connected thereto two flexible bands 46 and 47. The band 46 is wound around the drum 41, while the band 47 is wound around the drum 33. For operating the lever 45 there is provided a cam 48 on the shaft 22.

While the shear 17 is moving away from the shear 16, the cam 48 is acting upon the lever 45, swinging it in a clockwise direction and lifting the bands 46 and 47 with it so as to rotate the belt pulley 12, the roller 13 and the discharge rollers 25 and 26, in synchronism to advance the stalks.

As soon as the crank rod 21 has passed its upper dead center position the shear or knife 17 will be moved gradually downwardly and past the shear 16 to cut the stalks. While the knife is descending, the lever 45 is coacting with that portion of the cam 48 which permits the lever 45 to swing in a counterclockwise direction. To take up the slack in the bands 46 and 47 caused by this movement of the lever 45, the pulleys 34 and 42 have wound therearound cables 50 and 51 respectively connected to links 52 and 53 respectively which are pivoted at a fixed point and urged downwardly by springs 54 and 55 respectively. It will be seen, therefore, that as the tension on the bands 46 and 47 is reduced, the drums 34 and 42 are rotated in a counterclockwise direction so as to rewind the bands 46 and 47. However, this movement is not transmitted to the rollers 12, 13, 25 and 26, due to the unidirectional action of the clutches 35 and 40.

After the stalks have been cut into predetermined maximum lengths, they are moved into a suitable scutching device, which, in the specific form shown, consists of a pair of grooved rollers or drums 56 and 57, the roller 57 being urged into cooperative relationship with the roller 56 through the action of springs 58. A similar pair of scutching rollers 61 and 62 is provided at the inlet of a beating or defiberizing mechanism 63 enclosed in a casing 64 and forming part of the scutching mechanism. This beating or defiberizing mechanism by itself forms no part of the present invention, and may take any suitable form, for instance that shown in my Patent 1,658,842.

In the specific form shown, there is provided a drum 65 which carries pins or projections 66 constituting the working tools which strike or beat the material. Cooperating with this drum 65 is a drum 67 which is provided with pins or projections 68 on the periphery thereof, and which is so positioned with respect to the drum 65 that the pins of one pass closely adjacent to the pins of the other. The casing 64 has a grating portion 70 which permits the eliminated particles to drop therethrough, these particles dropping upon a conveyor belt 71 where they are carried away. After the material leaves the beating device 63, it may be returned to a scutching mechainsm which may include a pair of rollers 72 and 73 cooperating with rollers 56 and 61 respectively. From this mechanism, the material may be passed onto a second beating device 74 which may be similar to the beating device 63. This beating device is enclosed in a casing 75 which has a grated portion over the conveyor 71 so that the eliminated particles may fall thereon and be carried away thereby.

Having thus described my invention, what I claim as new and desire to secure by Letters Patent is:

1. An apparatus for treating fiber stalks, including cutting means, means for feeding fiber stalks longitudinally to said cutting means, means for interrupting the operation of said feeding means while said cutting means is acting on said stalks, a scutching mechanism, and continuously operating means disposed in the path of travel of said stalks for delivering said cut stalk sections endwise to said scutching mechanism.

2. An apparatus for treating fiber stalks, including means for feeding the fiber stalks step by step longitudinally, intermittently acting cutting means movable transversely of the path of movement of said stalks, a scutching mechanism, and means for delivering the cut stalk sections endwise from said cutting means to said scutching mechanism, and including means disposed near said cutting means for discharging the cut stalks from said cutting means, said last mentioned means being operated substantially in unison with said feeding means, and discharging said cut stalks at the same speed with which the uncut stalks are fed to said cutting means.

3. An apparatus for delivering fiber stalks, including a reciprocating knife, means for feeding fiber stalks longitudinally to said knife, means for interrupting the operation of the feeding means while said knife is cutting said stalks, a scutching mechanism including one or more rotatable drums for scutching and beating the cut stalks, and means for delivering said cut stalks endwise from said cutting means to said scutching mechanism endwise in a direction substantially at right angles to the axes of rotation of said drums.

4. An apparatus for delivering fiber stalks, including a reciprocating knife, means for feeding stalks longitudinally to said knife, means for interrupting the feeding operation of said feeding means while said knife is cutting said stalks, a scutching mechanism having a stalk delivery inlet substantially in the plane of movement of said stalk through the field of action of said reciprocating knife, and means for delivering the cut stalk sections endwise from said cutting means to said scutching mechanism.

5. Means for obtaining bast fibers from stems of plants, including feed rollers, delivery rollers, a reciprocating knife disposed between said feed rollers and delivery rollers, means for rotating said rollers to advance the stems and cut sections step by step, and a continuously running rotatable breaking mechanism, and a beating mechanism, said mechanisms being disposed contiguous to the cutting mechanism.

Signed at Stuttgart, Germany, this 9th day of February, A. D. 1931.

EMIL GMINDER.